United States Patent

[11] 3,551,715

| [72] | Inventors | Cyril Silvertown<br>London;<br>Eddie Wharton, Beaconsfield, England |
|---|---|---|
| [21] | Appl. No. | 818,740 |
| [22] | Filed | Apr. 23, 1969 |
| [45] | Patented | Dec. 29, 1970 |
| [73] | Assignee | Rotax Limited<br>London, England<br>a British Company |
| [32] | Priority | May 6, 1968 |
| [33] | | Great Britain |
| [31] | | No. 21264/68 |

[54] STATOR WINDING WITH PRINTED CIRCUIT CONNECTORS
2 Claims, 5 Drawing Figs.

[52] U.S. Cl. .................................................. 310/179, 310/254, 310/260
[51] Int. Cl. .................................................. H02k 3/26
[50] Field of Search ............................................. 310/PC, 71, 43, 179, 180, 208, 195, 254, 268, 154, 260, 270

[56] References Cited
UNITED STATES PATENTS

| 2,961,747 | 11/1960 | Lyman ............................ | 310/208X |
| 3,084,420 | 4/1963 | Burr et al. ...................... | 310/268X |
| 3,310,694 | 3/1967 | Hanna et al. .................... | 310/154 |
| 3,312,846 | 4/1967 | Henry-Baudot ................ | 310/268X |
| 3,356,877 | 12/1967 | Burr ................................. | 310/268X |

FOREIGN PATENTS

| 714,677 | 9/1954 | Great Britain ................ | 310/P.C. |

*Primary Examiner*—D. F. Duggan
*Attorney*—Holman, Glascock, Downing & Seebold

ABSTRACT: A dynamo electric machine including an annular stator structure on the internal periphery of which is secured a plurality of conductive strips which constitute the output strips being achieved by conductor configurations carried upon a printed circuit board.

PATENTED DEC 29 1970
3,551,715
SHEET 1 OF 2
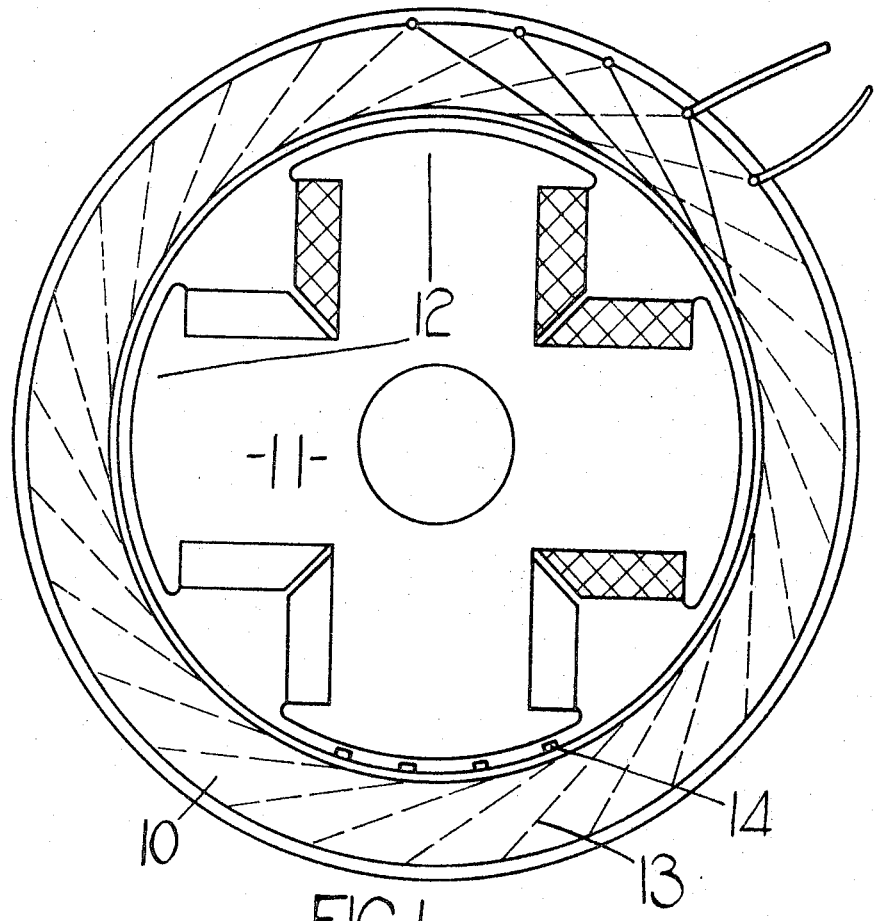
FIG. 1.
FIG. 2.
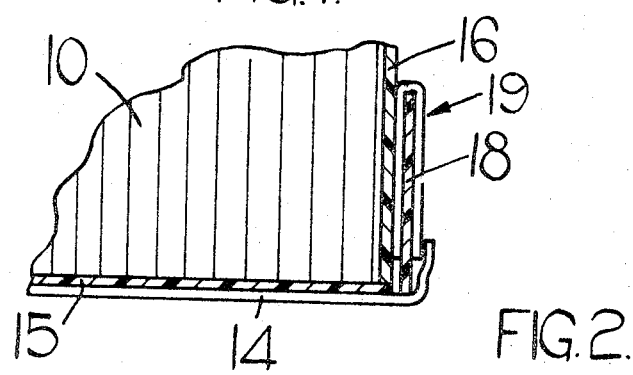
INVENTOR
Cyril Silvertown & Eddie Wharton
BY Holman, Glascock
Downing & Seebold
ATTORNEYS

PATENTED DEC 29 1970          3,551,715

INVENTOR
Cyril Silvertown & Eddie Wharton
BY Holman, Glascock,
Downing & Seebold
ATTORNEYS

STATOR WINDING WITH PRINTED CIRCUIT CONNECTORS

This invention relates to dynamo electric machines of the kind comprising a stator structure carrying windings and a rotor structure defining magnetic poles which as the rotor rotates either induce voltages in the windings in the case of a generator, or intersect with a magnetic flux created by current flowing in the windings in the case of a motor.

The object of the invention is to provide such a machine in a simple and convenient form.

According to the invention in a machine of the kind specified the stator windings are defined in part by electrically conductive strips secured to the stator structure intermediate the gap defined between the stator and rotor structures, annular printed circuit connecting boards being provided at the opposite ends of the stator structure respectively, said connecting boards serving to interconnect said strips to define said stator windings.

In the accompanying drawings:

FIG. 1 is an end elevation of one example of a dynamo electric machine in accordance with the invention with parts removed for the sake of clarity;

FIG. 2 is a section through part of the stator to an enlarged scale showing one form of connection;

Figure 3:
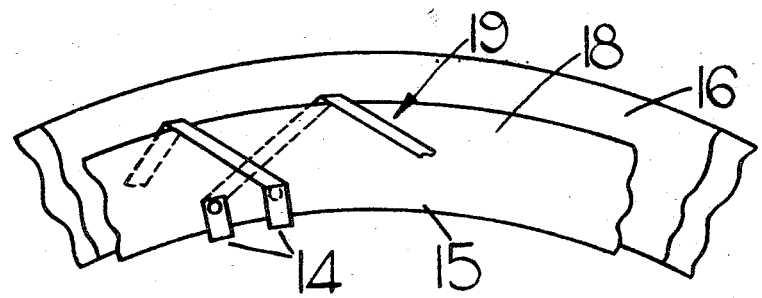
FIG. 3 is an end view of part of the stator to an enlarged scale showing the connection of FIG. 2.

In one example of a dynamo electric machine in accordance with the invention there is provided an annular stator structure 10 within which is mounted a rotor structure 11 which carries magnetizable pole pieces 12.

The inner periphery of the stator structure is smooth and the structure itself is composed of a plurality of annular laminations. The stator structure also carries output windings 13 in which a voltage is induced as the rotor structure rotates.

The output windings 13 are defined by a plurality of angularly spaced copper or similar strips 14 which are secured to the stator structure within the gap defined between the rotor and stator structures. The strips extend axially parallel to the axis of the stator structure or alternatively they may be skewed in known manner.

The strips 14 are formed by printed circuit techniques upon an insulating film 15 which is secured upon the internal periphery of the stator structure and in addition the annular end faces of the stator structure are provided with insulating films 16 respectively. The strips 14 are provided with extended portions at their opposite ends respectively and in order to form the windings the strips are connected together. As shown in FIGS. 2 and 3 the strips 14 all lie within the same circumferential plane but in the arrangement of FIGS. 4 and 5 strip strips 14 are provided in two such planes, a second film 17 of insulating material being provided between the strips in the two planes.

In order to connect the strips so as to form the windings there is attached to each end face of the stator structure a board which is of annular form and which carries printed circuit conductors so disposed as to enable the required connections to be made. As shown in FIGS. 2 and 3 the board is referenced 18 and is provided on its axially inner and outer end surfaces with a plurality of connector configurations 19. Each connector configuration 19 has a pair of limbs which are disposed on the inner and outer end surfaces of the board, the two limbs being electrically connected at their outer ends. The limbs extend inwardly and in opposite circumferential directions to points adjacent the periphery of the board. The end portions of the limbs on the inner end surface of the board terminate around apertures. The boards are secured to the stator structure mechanically or by adhesive and the connector portions of the strips 14 are turned outwardly. The outer limbs of the connector configurations 19 can be secured to the associated connector portions of the strips 14 by brazing or soldering whilst the inner limbs of the connector configurations can be secured to the associated connector portions by a metal plating process making use of the aforesaid holes and corresponding holes in the connector portions or by the use of rivets or pins which are inserted in the board prior to it being secured to the stator.

The end portions of the limbs of the connector configurations and the connector portions are arranged to overlap but it will be understood that the thickness is much smaller than is shown in the drawings particularly when compared with the thickness of the boards and the films. There is substantially no free space between the films, boards and stator.

Figure 4:
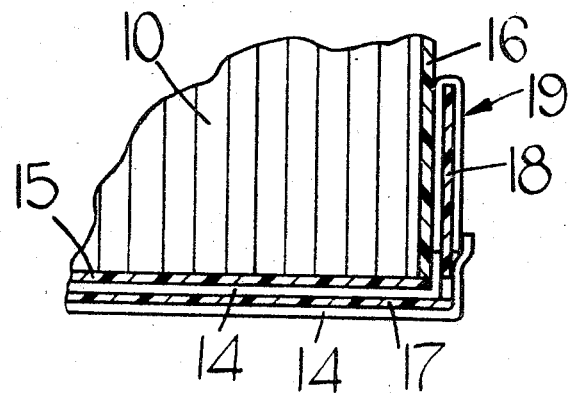
FIG. 4 is a view similar to FIG. 2 showing an alternative from of construction.
Figure 5:
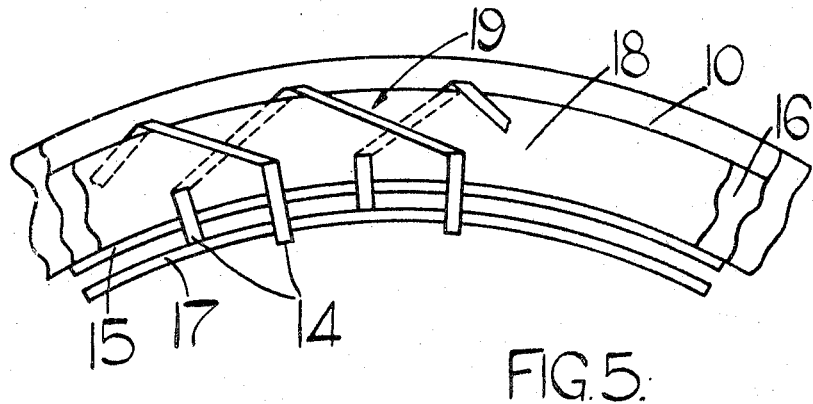
FIG. 5 is a view similar to FIG. 3 of the alternative form of construction.

In the arrangement shown in FIGS. 4 and 5 the connections between the connector configurations and the connector portions of the strips 14, are made on the opposite sides of the boards 18 and clearly the connector portions which are to be connected to the limbs of the connector configurations on the inside face of the board are turned outwardly before the board is secured to the stator structure 10. This ensures that in the completed assembly a space will exist between the outwardly turned portions of the connector portions of the strips this being important when the strips 14 are closer together than shown in the drawing. As in the previous example the connections on the outer side of the board are achieved by brazing or soldering whilst those on the inner side may be achieved by rivets or by a metal plating process.

By the arrangements described above a dynamo electric machine is provided which is devoid of stator slots and which is therefore electrically more efficient. Furthermore, the windings are in good heat exchange relationship with the stator structure since they are of strip form and are secured to the stator structure.

We claim:

1. A dynamo electric machine of the kind comprising a stator structure and a rotor structure, windings on the stator structure, magnetic poles defined by the rotor structure, an electrically insulating film secured to the surface of the stator structure presented to the rotor structure and to the sidewalls thereof, electrically conducting strips mounted on the stator structure on said surface, said strips serving to define parts of said windings, a pair of annular printed circuit connecting boards provided on the sidewalls of said stator structure respectively, a plurality of connector configurations on each of said boards, each connector configuration comprising a pair of electrically interconnected limbs on the opposite sides of the board respectively, connecting portions defined by said strips respectively, said connecting portions extending beyond the sidewalls of the stator structure and which are turned in a radial direction so as to lie alongside the outside face of the adjacent board at positions to be electrically connected to the appropriate limbs of the connector configurations.

2. A dynamo electric machine of the kind comprising a stator structure and a rotor structure, windings on the stator structure, magnetic poles defined by the rotor structure, an electrically insulating film secured to the surface of the stator structure presented to the rotor structure and to the sidewalls thereof, electrically conducting strips mounted on the stator structure on said surface, said strips serving to define parts of said windings, a pair of annular printed circuit connecting boards provided on the sidewalls of said stator structure respectively, a plurality of connector configurations on each of said boards, each connector configuration comprising a pair of electrically interconnected limbs on the opposite sides of the board respectively, connecting portions defined by said strips respectively, said connecting portions extending beyond the sidewalls ends of the stator structure and which are turned in a radial direction, some of said turned portions being disposed alongside the inner face of the board whilst the remaining ones are disposed alongside the outer face of the board.